(12) United States Patent
Robertson et al.

(10) Patent No.: US 8,638,161 B2
(45) Date of Patent: Jan. 28, 2014

(54) POWER CONTROL DEVICE AND METHOD THEREFOR

(75) Inventors: Peter Robertson, Sunnyvale, CA (US);
Andre Gunther, San Jose, CA (US);
Kevin Mahooti, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 54 days.

(21) Appl. No.: 13/187,302

(22) Filed: Jul. 20, 2011

(65) Prior Publication Data
US 2013/0021090 A1  Jan. 24, 2013

(51) Int. Cl.
*G05F 1/10* (2006.01)

(52) U.S. Cl.
USPC ............................. 327/540; 327/538; 327/143

(58) Field of Classification Search
None
See application file for complete search history.

(56) References Cited

U.S. PATENT DOCUMENTS

| | | | | |
|---|---|---|---|---|
| 5,347,170 A | * | 9/1994 | Hayakawa et al. | 327/541 |
| 5,396,113 A | * | 3/1995 | Park et al. | 327/543 |
| 5,696,465 A | * | 12/1997 | Ishizuka | 327/544 |
| 5,774,813 A | * | 6/1998 | Jokinen | 455/574 |
| 5,818,781 A | * | 10/1998 | Estakhri et al. | 365/226 |
| 6,184,744 B1 | * | 2/2001 | Morishita | 327/541 |
| 6,201,374 B1 | * | 3/2001 | Ater et al. | 323/267 |
| 6,667,603 B2 | * | 12/2003 | Hiraki et al. | 323/268 |
| 6,795,366 B2 | * | 9/2004 | Lee | 365/226 |
| 7,200,066 B2 | * | 4/2007 | Krenzke et al. | 365/226 |
| 7,362,079 B1 | | 4/2008 | Maheedhar et al. | |
| 7,397,226 B1 | | 7/2008 | Mannama et al. | |
| 8,044,647 B2 | * | 10/2011 | Kang | 323/280 |
| 2005/0140406 A1 | * | 6/2005 | Rizzo et al. | 327/143 |
| 2006/0017494 A1 | * | 1/2006 | Horiguchi et al. | 327/538 |
| 2007/0024351 A1 | * | 2/2007 | Kang | 327/541 |
| 2008/0001653 A1 | * | 1/2008 | Lee et al. | 327/541 |
| 2009/0168585 A1 | * | 7/2009 | Kang | 365/226 |

* cited by examiner

*Primary Examiner* — Thomas J Hiltunen

(57) ABSTRACT

Power control is facilitated. In accordance with one or more embodiments, power is supplied to power rails of an integrated circuit using a power control circuit including a power regulator and a reset circuit that is responsive to a supply voltage. The power regulator provides power to the power rails, based upon a control signal. The reset circuit controls the power regulator to provide power to the power rails independently of the control signal when the supply voltage is below an operational voltage level, and controls the power regulator to provide power to the power rails in response to the control signal when the supply voltage reaches the operational voltage level.

19 Claims, 2 Drawing Sheets

POWER CONTROL DEVICE AND METHOD THEREFOR

Figure 1:
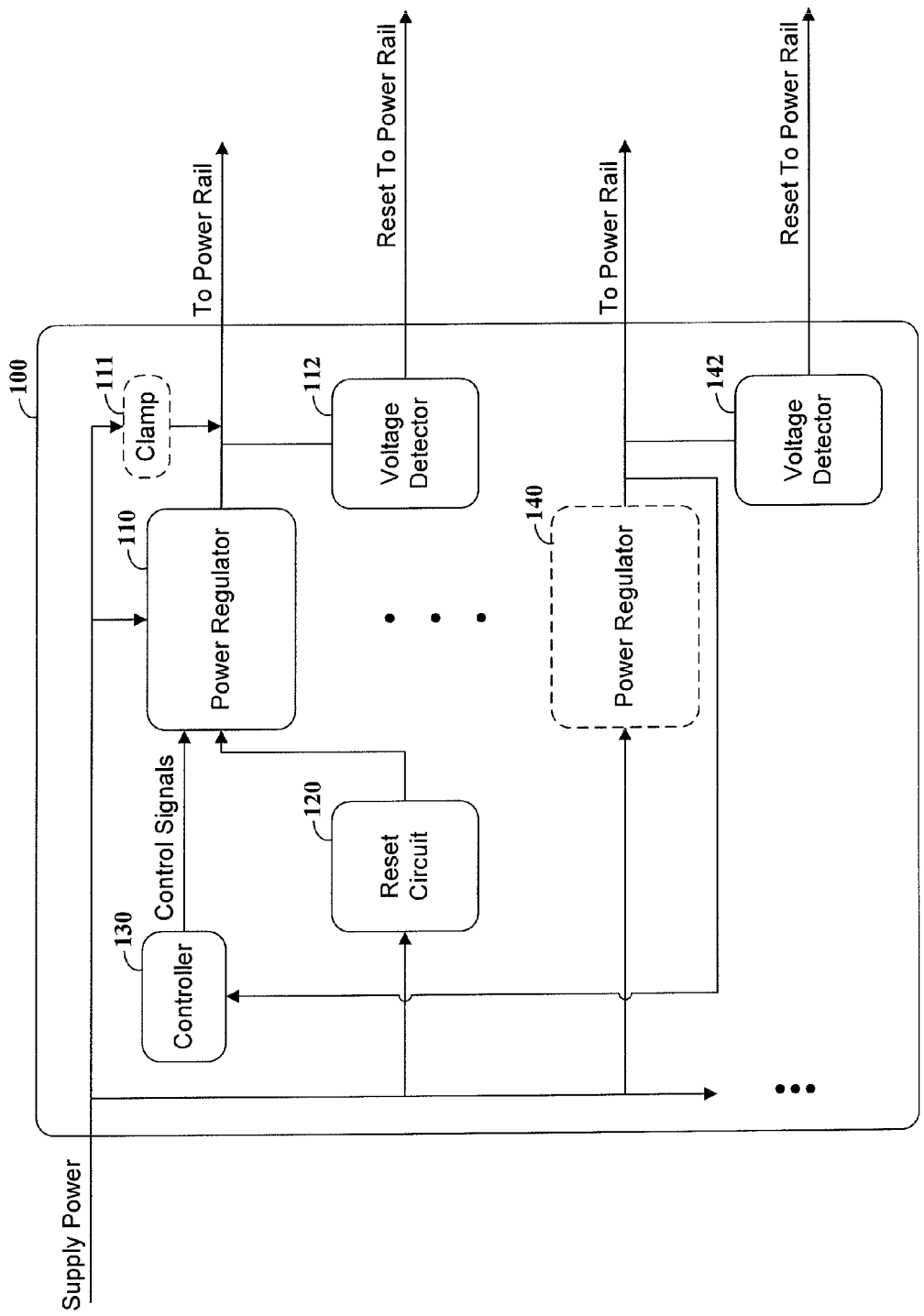

In many electronic circuit applications, various circuits are not powered at certain times, during which times the circuits can be placed in a low-power or standby mode in which the circuits draw less power. For example, many low power microcontrollers include mixed signal blocks, such as those including data converters, temperature sensors, comparators, or voltage references. In many implementations, not all blocks are required all the time, and often, all circuit blocks can be powered down until a time at which the circuits are needed. These approaches can save power, which can be particularly useful in battery-powered applications.

For example, mixed-signal integrated circuits often operate using different internal voltage levels, which are provided using a single external voltage and a power control unit in the integrated circuit that generates different internal voltages. In low-power or standby operation, the power control unit turns off voltage rails that are not being used, and desirably operates at low power. When the integrated circuit needs to respond to an external stimulus and/or during initial power-up, the power control unit desirably supplies internal power rapidly, to facilitate a fast response time.

However, the rapid power up of integrated circuits can be challenging to implement, particularly as many power supplies (e.g., voltage regulators) require time in which to ramp up to provide full power, as do the functional circuit blocks being supplied. These and other issues continue to present challenges to the implementation of circuits that consume low power, yet operate to rapidly respond to requests.

Various example embodiments are directed to power control circuits and approaches, and to addressing various challenges including those discussed above.

According to an example embodiment, a power control circuit includes a power regulator and a reset circuit, and powers rails of an integrated circuit. The power regulator provides power to the power rails, based upon a control signal. The reset circuit detects the supply voltage of power supplied to the power regulator and uses the detected supply voltage to control the power regulator. In particular, in response to the detected supply voltage being below an operational voltage level, the reset circuit controls the power regulator to provide power to the power rails independently of the control signal. In response to the detected supply voltage reaching the operational voltage level, the reset circuit controls the power regulator to provide power to the power rails in response to the control signal.

Another example embodiment is directed to a power control circuit for powering the power rails of an integrated circuit. The power control circuit includes first and second power regulators, a control circuit and a reset circuit. The first power regulator provides power to the power rails based upon a control signal that is generated by the control circuit. The second power regulator powers the control circuit and provides power to the power rails at a standby power level. The reset circuit controls the first power regulator to provide power to the power rails independently of the control signal, in response to power supplied to the control circuit being less than a predefined power level at which the control circuit operates. In this context, the first power regulator is operated to power up without necessarily regarding any control signals therefore, and can be returned to normal operation (in response to the control signals) after a sufficient power level has been reached (e.g., a power level at which control signals can be provided in a stable manner).

Another example embodiment is directed to a method for powering power rails of an integrated circuit. A control signal is provided to a power regulator circuit for controlling the power regulator circuit to provide power to the power rails. In response to a supply power being below a threshold, the power regulator circuit is controlled to provide power to the power rails independently of the control signal. In response to the supply power reaching the threshold, the power regulator circuit is controlled to provide power to the power rails in response to the control signal.

The above discussion is not intended to describe each embodiment or every implementation of the present disclosure. The figures and following description also exemplify various embodiments.

Figure 2:
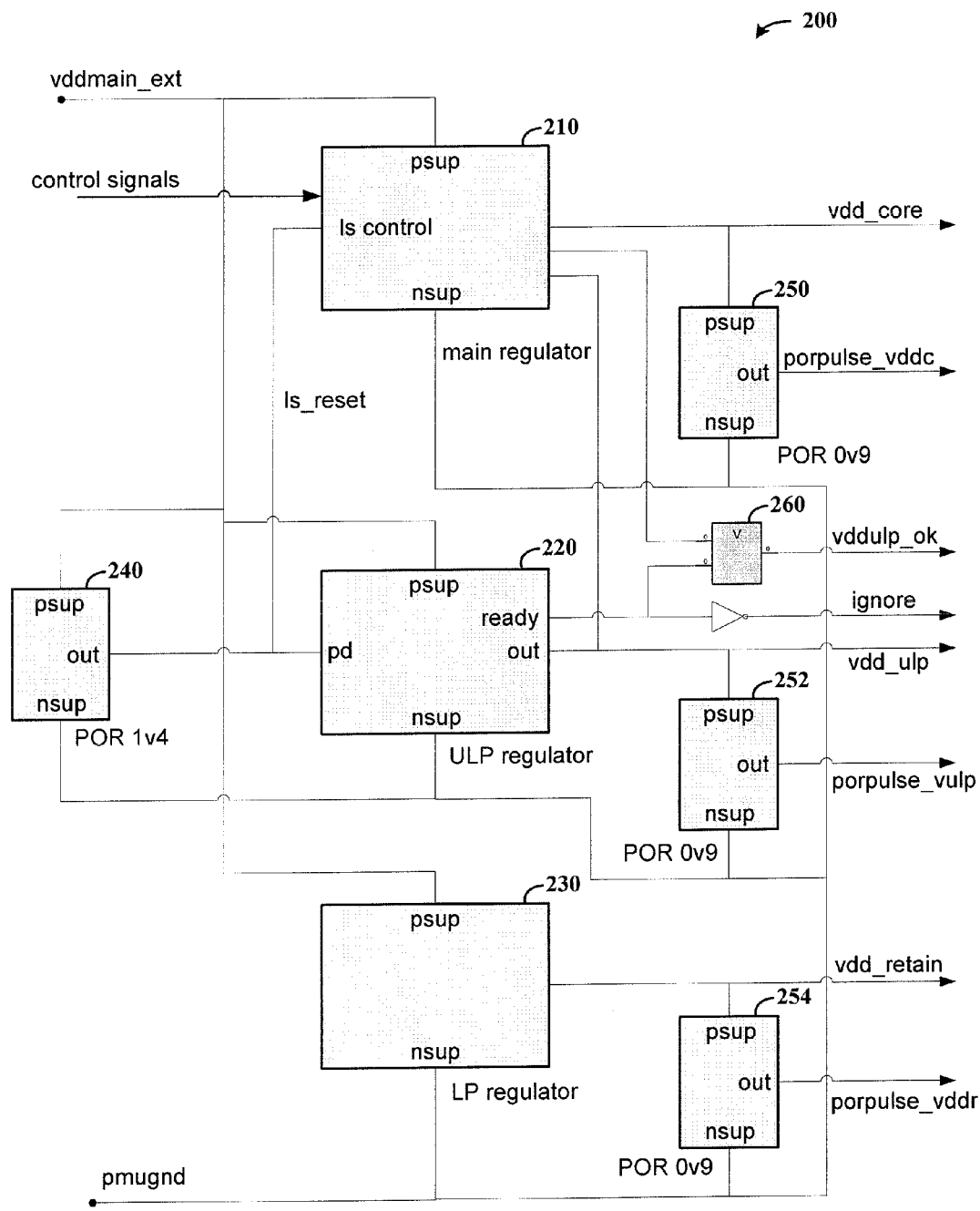

Various example embodiments may be more completely understood in consideration of the following detailed description in connection with the accompanying drawings, in which:

FIG. 1 shows a power regulator, in accordance with an example embodiment of the present invention; and FIG. 2 shows another power regulator, in accordance with another example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of circuits, devices and systems for and/or involving power controllers. While the present invention is not necessarily limited in this context, various aspects of the invention may be appreciated through a discussion of related examples.

In accordance with various example embodiments, a power control unit for an integrated circuit converts externally applied power to one or more internal voltages for use by various on-chip circuits, such as phase-locked loops, clock generators, data converters, temperature sensors, or voltage and current references. A fast start mechanism is used to supply an initial voltage level while regulator circuits are powering up and stabilizing. To facilitate the response of powered-down on-chip circuits to interrupts, the fast start mechanism operates to initiate power-up of these circuits while controlling regulator circuits and, as appropriate, resetting control signals for the on-chip circuits that may be in unknown states. In some implementations, this approach involves controlling one or more power regulators to operate independently from control signals, until the internal power provided for operating the regulator (and/or a control signal therefor) has been stabilized.

In some embodiments, the fast start mechanism includes a clamp circuit that facilitates the use/coupling of the external voltage to directly charge the internal voltage of the integrated circuit until the clamp voltage has been reached. After the claim voltage has been reached, the clamp circuit cuts off the external voltage so that the internal voltage is not overcharged. This approach may, for example, provide a very fast but inaccurate ramp-up of voltage for a start-up mode. After start-up, the controlling regulator circuits are used to provide what is a relatively slow but more accurate voltage to the integrated circuit. This combination of clamp circuit and power regulators provide an internal voltage to the integrated circuit that is initially not very accurate, but can allow the internal circuits to start up quickly, and that is accurate/regulated for long-term (post start-up) modes of operation.

Accordingly, based upon a supply voltage, internal control signals (which might be in an unknown state) are prevented from hindering the boot-up of the integrated circuit powered via the power control unit. Once the boot-up has reached a level at which control signals can be reliably provided, control of power regulators can be released to the control signals. Using this approach, power can be provided to an integrated circuit chip immediately upon the coupling of an external power supply, without necessarily regarding the state of control signals used to control the power regulators, and thus without concern that the (e.g., floating) control signals may be unstable or in an undesirable state. Regulation mechanisms, such as those that may be implemented using a bandgap-based regulator circuit, are thus bypassed during such a boot-up stage, providing the ability to more rapidly power integrated circuits.

In some embodiments, the power control unit includes a voltage detector that effects reset and related control functions for initiating such a fast start-up sequence, based upon a supply voltage for operating a regulator. One or more voltage detectors may also used on internal power rails for timing the power-up, and synchronizing the start-up, of the functional blocks powered via the internal power rails.

In a particular example embodiment, the power control unit is a circuit block that is part of a mixed-signal integrated circuit, such as a microcontroller having data converters. The power control unit includes one or more voltage regulators that convert voltage from an external power supply of the integrated circuit to one or more internal voltages, and provides reset signals that are used to initialize and power circuit blocks of the integrated circuit. The regulators may include, for example, a main regulator as well as one or more secondary regulators that supply power in non-standard modes. The power control unit includes a voltage detector for each internal and external power rail, with each voltage detector generating logic signals that indicate the state of the rail. The detector on the external power rail resets the other control signals or otherwise delays/suspends power-up of the integrated circuit until the external voltage level is adequate for supplying power to the integrated circuit (e.g., voltage beyond an operational threshold may be sufficient to ensure proper operation of the integrated circuit). The detectors on the internal voltage rails generate signals to reset the functional blocks of the integrated circuit when proper operating voltages have been reached. A digital logic block controls and synchronizes the reset signals. The voltage detectors, with the voltage regulators, facilitate rapid boot-up of a microcontroller once external power has been applied.

The voltage detectors may be implemented using POR (power-on reset) blocks, or BOD (brown-out detector) blocks, which output a signal when the supply voltage reaches a pre-determined voltage level. The signal is used to reset logic inside a main regulator and place this logic in a known state, which can mitigate a need to resolve an unknown state of the logic.

In some embodiments, the logic inside the main regulator is used to control the mode of the main regulator, so that different power modes can be supported. By initializing this logic, the main regulator can be controlled by the POR block, which can mitigate the need for an additional regulator to control the power-up sequence. For example, using the POR block to control power-up, the main regulator can power up by itself and use the voltage it regulates to power its own logic. Moreover, reset signals can be provided to the main regulator during power-up so that the main regulator operates to provide power independently of control signals generated therein (e.g., to avoid applying signals of unknown states), yet after a sufficient power level has been reached the control signals can be set and provided in a stable manner to control the main regulator in whatever power mode is necessary.

In many implementations, the POR blocks are analog circuit blocks having an output that is equal to the power supply voltage when powering up, and at some pre-determined threshold, is switched to zero. In this way, when the output of the POR switches to zero after power has been applied, the voltage level of the power supply can be detected. Further, such POR blocks can be implemented to consume little (or about no) DC power.

In certain embodiments, one or more additional regulators are used to power a main regulator having self-powering characteristics as discussed above. The additional regulators can be used for servicing power modes that prevent the main regulator from powering itself. When the main regulator operates in a standard power mode (e.g., where non-standard modes are not serviced), the additional regulator(s) can be powered up slowly if not needed for powering logic of the main regulator. In these and other embodiments, such non-standard power modes may include standby or low frequency modes, in which the entire integrated circuit needs less power, and consequently the power control unit can be designed to use less power in these modes.

In accordance with other example embodiments, a power control unit as discussed above includes two or more regulators, voltage detectors and control logic. A main regulator provides a main voltage level for an integrated circuit, and a standby regulator provides a standby voltage level for the integrated circuit as well as voltage to control the main regulator. The standby regulator is further configured to output an ignore signal to the main regulator, indicating that the standby regulator is not ready to power the main regulator, if the standby regulator is unable to power up fast enough upon application of external power. In response to this ignore signal, the main regulator ignores control signals from the main regulator control logic. This allows the main regulator to power up in spite of the state of the standby regulator. Once the standby regulator has powered up to provide sufficient power for operating the main regulator, the standby regulator removes the ignore signal, and the main regulator responds to the control signals. This approach facilitates the use of low-power standby regulators, which power up relatively slowly, to power main regulators. If additional regulators are present, the ignore signal can also be used to control the additional regulators.

For operating in non-standard power modes, additional POR blocks are connected to internal voltage rails of the integrated circuit and configured to generate signals that indicate a condition of the internal voltage rails. The condition signals control functional blocks connected to respective internal voltage rails to initialize, reset, and synchronize any functional blocks connected to the respective voltage rails.

Other embodiments are directed to methods for powering power rails of an integrated circuit, and/or for controlling a power regulator to do so. These methods may be carried out in accordance with one or more embodiments as described herein, and further with one or more components as shown in the figures. In one embodiment, a control signal is provided to a power regulator circuit for controlling the power regulator circuit to provide power to power rails of an integrated circuit. The power regulator is controlled to provide power to the power rails independently of the control signal, in response to a supply power being below a threshold. If the supply power reaches (or exceeds) the threshold, the power regulator is controlled to provide power to the power rails based upon the control signal. In various implementations, the control signal is also reset upon reaching the threshold, and subsequently used to control the power mode of the power regulator.

The various embodiments as discussed herein may be implemented in connection with a variety of different types of circuits, in a variety of different applications. For example, certain embodiments are directed to power control with devices such as a personal electronic device (e.g., a watch or toy), a hand-held device such as a phone or media player, or a computer. Accordingly, a stimulus as referred to herein and as relevant to entering a start-up mode may involve a user-initiated input such as the push of a button or touch-screen interaction, or an automated input involving a call to a particular function.

Turning now to the figures, FIG. 1 shows a power regulator 100, in accordance with other example embodiments of the present invention. The power regulator 100 includes a main regulator circuit 110 that provides power to a power rail of an integrated circuit, and a reset circuit 120 that generates a reset signal for controlling the main regulator circuit 110. The main regulator is responsive to the reset signal by providing power to the power rail independently from control signals (e.g., to ignore control signals) and, in the absence of the reset signal, providing power to the power rail in response to the control signals.

In one embodiment, the reset circuit 120 detects the supply voltage provided to the power regulator 100. In response to the detected supply voltage being below an operational voltage level, the reset circuit controls the power regulator to provide power to the power rails independently of the control signal. In response to the detected supply voltage reaching the operational voltage level, the reset circuit controls the main regulator circuit 110 to provide power to the power rails in response to the control signal. In one implementation, the reset circuit 120 also generates a reset signal to reset the control signals provided to the main regulator circuit 110, after reaching the operational voltage level and before controlling the main regulator circuit to provide power to the power rails (e.g., to ensure proper control signals are used).

The power regulator 100 may also include one or more additional circuits as shown, including a controller 130 that provides the control signals, one or more additional regulators including a standby regulator circuit 140 as shown, as well as voltage detectors for each regulator and including voltage detectors 112 and 142. The controller 130 may, for example, be implemented as part of the main regulator circuit 110, and be powered internally by the main regulator circuit and/or by another regulator (e.g., by standby regulator 140). The voltage detectors 112 and 142 can be used to detect voltage provided by the respective regulators, and to respectively control the application of this voltage for controlling an integrated circuit, such as by generating reset signals based upon reaching an operational voltage level for internal power rails of the integrated circuit.

In some implementations, a clamp circuit 111, which may be included as part of the main regulator 110, is used to initially clamp the supply power to the power rail during start-up, in a manner such as described above. The main regulator 110 is responsive to the reset signal by providing power to the power rail independently from control signals (e.g., to ignore control signals), with the reset signal also being used to control the clamp circuit 111 to clamp the supply power to the power rail. When the reset signal is released, the clamp circuit 111 responds by decoupling the supply power from the power rail, as the main regulator 110 is used to provide regulated power to the power rail. Accordingly, the clamp circuit 111 may be used to bypass another regulator circuit, such as a bandgap-type regulator circuit, within the main regulator 110 during start-up conditions.

In one embodiment, the reset circuit 120 provides an ignore signal to the main regulator circuit 110 under conditions in which the control signals provided by the controller 130 are unstable (e.g., as may be due to an insufficient supply voltage, or to the ability of the standby regulator 140 to provide a full/operational power level for generating stable control signals). The main regulator 110 is responsive to the ignore signal by providing power to the rail independently from the control signals, effectively ignoring the control signals. Upon reaching a power level at which the controller 130 can provide stable control signals, the control signals are reset to a known state and used to control the operation of the main regulator circuit 110. In this context, a portion (or all of) the reset circuit 120 may be implemented with the standby regulator circuit 140.

FIG. 2 shows another power regulator 200, in accordance with another example embodiment of the present invention. The power regulator 200 includes a main power regulator 210 that provides a main/normal operational voltage level for an integrated circuit, and secondary regulators 220 (ULP) and 230 (LP) that provide other/non-main power levels. The power regulator 200 also includes power on reset (POR) blocks 240, 250, 252 and 254, as well as a logic state machine 260 that provides an output indicative of the presence of an appropriate voltage at the secondary regulator 220. External power is coupled to each of the regulators 210, 220 and 230, as well as the POR block 240. The POR block 250, 252 and 254 are powered by the respective regulators (or corresponding rails) to which they are coupled (210, 220 and 230, respectively). The POR block 240 monitors for the presence of external supply power, and provides an ignore reset signal Is_reset (e.g., a power-on pulse signal) that causes the main power regulator 210 to ignore internal control signals from control logic. In some implementations, the ignore reset signal Is_reset also resets level shifters of the main power regulator 210.

The regulator 220 is configured to power the main regulator 210, as well as to provide an output vdd_ulp to power an internal rail for an integrated circuit. In some implementations, the regulator 220 outputs an ignore signal if the regulator 220 is not ready to power the main regulator, such as in response to the regulator 220 being unable to power up fast enough upon application of external power. In response to this ignore signal, the main regulator 220 ignores control signals from the main regulator control logic, which allows the main regulator to power up in spite of the state of the regulator 220. Once the regulator 220 has powered up to provide sufficient power for operating the main regulator, such an ignore signal is removed in order to control the main regulator 210 to respond to the aforesaid control signals.

The respective POR blocks 250, 252 and 254 are connected to internal voltage rails of an integrated circuit, and generate signals that indicate a condition of the power supplied to the internal voltage rails. These condition signals control functional blocks connected to respective internal voltage rails, such as to initialize, reset, and synchronize any functional blocks connected to the respective voltage rails.

In an example application of the circuit regulator 200, when the vdd_core signal from the main regulator 210 is powered off, the POR block 250 connected to vdd_core provides an output indicative of the timing of the power off sequence, so that logic connected to vdd_core can functionally terminate. Upon subsequent power-up of the main regulator 210 (and correspondingly, vdd_core), the POR block 250 generates a reset signal when the vdd_core rail is at the correct voltage. POR block 252 also generates a reset pulse porpulse_vulp that powers up when vdd_core does. The reset, signal from POR block 250 can be coordinated with the power-up of the vdd_retain signal from regulator 230, to facilitate use of the vdd_retain signal by logic blocks. The logic state machine 260 is powered by the vdd_ulp rail from regulator 220, which powers down when the external voltage supply has been removed and stays powered in non-standard power modes. When the external voltage supply is subsequently reconnected, the main regulator 210 powers up into the standard mode, without necessarily needing the regulator 220. The different POR blocks may also trigger at different voltage levels, and the different regulators may also output different voltage levels. In some implementations, control of the different POR trigger signals and regulator outputs is carried out by a logic network powered by the vdd_ulp voltage and reset by the vdd_ulp reset signal.

Based upon the above discussion and illustrations, those skilled in the art will readily recognize that various modifications and changes may be made to the present invention without strictly following the exemplary embodiments and applications illustrated and described herein. For example, additional power regulators may be implemented in a manner similar to that of the main or secondary regulators as discussed herein. In addition, the embodiments described in connection with the figures may be implemented with part of the components shown in the figures or otherwise, and embodiments described separately from the figures may be implemented using one or more components in the figures. Such modifications do not depart from the true spirit and scope of the present invention, including that set forth in the following claims. Furthermore, the term "example" as used throughout this document is by way of illustration, and not limitation.

What is claimed is:

1. A power control circuit for powering power rails of an integrated circuit, the power control circuit comprising:
    a power regulator configured and arranged to provide power to the power rails, based upon a control signal; and
    a reset circuit configured and arranged to detect the supply voltage of power supplied to the power regulator and to,
        in response to the detected supply voltage being below an operational voltage level, control the power regulator to provide power to the power rails independently of the control signal, and
        in response to the detected supply voltage reaching the operational voltage level, output a reset signal to reset the control signal and, after resetting the control signal, control the power regulator to provide power to the power rails based on the control signal.

2. The power control circuit of claim 1, wherein the reset circuit is configured and arranged to control the power regulator to operate independently of the control signal by outputting a signal that causes the power regulator to
    ignore control signals that would regulate the power provided by the power regulator, and output unregulated power to the power rails.

3. The power control circuit of claim 1, wherein
    the power regulator includes a clamp circuit configured and arranged to couple received power at the regulator to the power rails, and
    the reset circuit is configured and arranged to
        control the power regulator to provide power to the power rails independently of the control signal by controlling the clamp circuit to couple the received power to the power rails, and,
        control the power regulator to provide power to the power rails based on the control signal by controlling the clamp circuit to decouple the received power from the power rails.

4. The power control circuit of claim 1, wherein
    the reset circuit is configured and arranged to control the power regulator to operate independently of the control signal by outputting a reset signal to the power regulator, and
    the power regulator is configured and arranged to operate independently of the control signal in response to the reset signal.

5. The power control circuit of claim 1, wherein the reset circuit is configured and arranged to
    control the power regulator to operate independently of the control signal by outputting a reset signal to the power regulator to control the power regulator to operate independently of the control signal, and
    control the power regulator to respond to the control signal by stopping outputting the reset signal to control the power regulator to respond to the control signal.

6. The power control circuit of claim 1, wherein the reset circuit is configured and arranged to control the power regulator to respond to the control signal in response to the control signal stabilizing and being reset.

7. The power control circuit of claim 1, further including a second power regulator configured and arranged to power control circuitry that generates the control signal.

8. The power control circuit of claim 1,
    further including a second regulator configured and arranged to power control circuitry that generates the control signal, and to output an ignore signal until the second regulator supplies power to the control circuitry at a threshold voltage level at which the control circuitry can stably generate the control signal; and
    the power regulator is configured to respond to the ignore signal by ignoring the generated control signal.

9. The power control circuit of claim 1, further including, for each of the power rails, a rail voltage detector configured and arranged to detect a rail voltage of the power rail, and to output a reset signal to a circuit powered via the power rail, in response to the power regulator outputting a voltage to the power rail that exceeds a predefined threshold voltage level at which the circuit powered via the power rail operates.

10. The power control circuit of claim 1, further including, for each of the power rails, a rail voltage detector configured and arranged to detect a rail voltage of the power rail, and to output synchronized reset signals to reset all circuits powered via the power rail, in response to the power regulator outputting a voltage to the power rail that exceeds a predefined threshold voltage level at which the circuits powered via the power rail operate.

11. The power control circuit of claim 1, wherein the power regulator includes control logic that generates the control signal, the control logic being powered by voltage that the power regulator regulates.

12. A power control circuit for powering power rails of an integrated circuit, the power control circuit comprising:
    a first power regulator configured and arranged to provide power to a first power rail, based upon a control signal;
    a control circuit configured and arranged to generate the control signal;
    a second power regulator configured and arranged to power the control circuit and to provide power to a second power rail at a standby power level; and a reset circuit configured and arranged to control the first power regulator to provide power to the first power rail independently of the control signal, in response to power supplied to the control circuit being less than a first predefined power level at which the control circuit operates.

13. The power control circuit of claim 12, wherein the reset circuit is configured and arranged to control the first power regulator to provide power to the first power rail independently of the control signal in response to a supply voltage provided to the power control circuit being below a predefined voltage.

14. The power control circuit of claim 12, wherein the reset circuit is configured and arranged to control the first power regulator to provide power to the first power rail independently of the control signal in response to a supply voltage provided to the control circuit by the second power regulator being below a predefined voltage.

15. The power control circuit of claim 12, wherein
the second power regulator includes at least a portion of the reset circuit, and
the portion of the reset circuit is configured and arranged to generate an ignore output signal to control the first power regulator to provide power to the first power rail independently of the control signal in response to a startup condition, and to stop generating the ignore output in response to the second power regulator reaching a predefined voltage level.

16. The power control circuit of claim 12, wherein the reset circuit is configured and arranged to detect the supply voltage of power supplied to the power regulator and to
in response to the detected supply voltage being below an operational voltage level, control the power regulator to provide power to the first power rail independently of the control signal, and
in response to the detected supply voltage reaching the operational voltage level, control the power regulator to provide power to the first power rail based on the control signal.

17. The power control circuit of claim 12, wherein the second power regulator is further configured and arranged to power the control circuit and to provide power to a second power rail independent of the control signal.

18. The power control circuit of claim 12, further comprising
a second reset circuit configured and arranged to control the second power regulator to provide power to the second power rail independently of the control signal, in response to power supplied to the control circuit being less than a second predefined power level, the second predefined power level being different than the first predefined power level.

19. A method for powering power rails of an integrated circuit, the method comprising:
providing a control signal to a power regulator circuit for controlling the power regulator circuit to provide power to the power rails;
in response to a supply power being below a threshold, controlling the power regulator circuit to provide power to the power rails independently of the control signal; and
in response to the supply power reaching the threshold, controlling the power regulator circuit to provide power to the power rails based on the control signal,
wherein providing a control signal to a power regulator circuit includes generating the control signal at a control circuit,
further including powering the control circuit with a standby power regulator circuit, and
wherein controlling the power regulator circuit to provide power to the power rails independently of the control signal in response to a supply power being below a threshold includes controlling the power regulator to provide the power to the power rails independently of the control signal in response to a voltage level of the standby power regulator being below a threshold, and
wherein controlling, in response to the supply power reaching the threshold, the power regulator circuit to provide power to the power rails based on the control signal includes controlling the power regulator to provide the power to the power rails in response to the supply voltage level of the standby power regulator reaching the threshold.

* * * * *